United States Patent [19]
Murakami et al.

[11] 3,956,946
[45] May 18, 1976

[54] SPEED CHANGE GEAR SYSTEM

[75] Inventors: Noboru Murakami, Nagoya; Koichiro Hirozawa, Kariya; Kazuo Ohara; Koichi Matsuo, both of Toyota, all of Japan

[73] Assignee: Aisin Seiki Kabushiki Kaisha, Japan

[22] Filed: Oct. 11, 1974

[21] Appl. No.: 514,134

[30] Foreign Application Priority Data
Oct. 12, 1973 Japan............................ 48-114984

[52] U.S. Cl................................. 74/759; 74/753; 74/769; 74/770
[51] Int. Cl.²......................................... F16H 57/10
[58] Field of Search ............ 74/759, 758, 768, 769, 74/770, 753

[56] References Cited
UNITED STATES PATENTS

| | | | |
|---|---|---|---|
| 2,651,950 | 9/1953 | Schou................................... | 74/759 |
| 2,672,767 | 3/1954 | Schneider.......................... | 74/759 X |
| 3,067,632 | 12/1962 | Foerster et al........................ | 74/759 |
| 3,282,131 | 11/1966 | Smith................................ | 74/759 X |

Primary Examiner—Samuel Scott
Assistant Examiner—Lance W. Chandler
Attorney, Agent, or Firm—Oblon, Fisher, Spivak, McClelland & Maier

[57] ABSTRACT

A speed change gear system of the planetary gear type suited for applications within fluid couplings used upon automotive vehicles includes an input shaft and a first planetary gear set which includes a first sun gear, a first planetary gear engaged with the first sun gear, a first ring gear engaged with the first planetary gear, and a first carrier rotatably supporting the first planetary gear. A second planetary gear set similarly includes a second ring gear drivingly connected to the first carrier, a second planetary gear engaged with the second ring gear, a second sun gear engaged with the second planetary gear, and a second carrier rotatably supporting the second planetary gear, while a third planetary gear set likewise includes a third sun gear drivingly connected to the second sun gear, a third planetary gear engaged with the third sun gear, a third ring gear engaged with the third planetary gear and drivingly connected to the first ring gear and the second carrier, and a third carrier rotatably supporting the third planetary gear.

A first clutch is provided for simultaneously coupling or uncoupling the second and third sun gears to or from the input shaft while a second clutch is also provided for simultaneously coupling or uncoupling the second carrier and the first and third ring gears to or from the input shaft, and a third clutch is likewise provided for coupling or uncoupling the first sun gear to or from the input shaft. A first brake is also provided within the system and is capable of being actuated for locking the first sun gear to the gear casing, while a second brake is likewise provided and is capable of being actuated for simultaneously locking the first carrier and the second ring gear to the casing and a third brake is similarly capable of being actuated for simultaneously locking the first and third ring gears and the second carrier to the casing. The output shaft is dynamically connected to the third carrier as one integral unit.

5 Claims, 27 Drawing Figures

FIG. 1B

|     | CL1 | CL2 | CL3 | B1 | B2 | B3 |   | GEAR RATIO |
|-----|-----|-----|-----|----|----|----|---|------------|
| F 1 | ○   |     |     |    |    | ○  |   | 1 : 3.82   |
| F 2 | ○   |     |     |    | ○  |    |   | 1 : 2.27   |
| F 3 | ○   |     |     | ○  |    |    |   | 1 : 1.55   |
| F 4 | ○   | ○   |     |    |    |    |   | 1 : 1.00   |
| F 5 |     | ○   |     | ○  |    |    |   | 1 : 0.81   |
| F 6 |     | ○   |     |    | ○  |    |   | 1 : 0.55   |
| R 1 |     |     | ○   |    |    | ○  |   | 1 : −4.14  |
| R 2 |     |     | ○   |    | ○  |    |   | 1 : −1.31  |

FIG. 2B

|     | CL1 | CL2 | CL3 | B1 | B2 | B3 | B4 | GEAR RATIO |
|-----|-----|-----|-----|----|----|----|----|------------|
| F 1 | ○   |     |     |    |    |    | ○  | 1 : 5.40   |
| F 2 | ○   |     |     |    |    | ○  |    | 1 : 3.82   |
| F 3 | ○   |     |     |    | ○  |    |    | 1 : 2.27   |
| F 4 | ○   |     |     | ○  |    |    |    | 1 : 1.55   |
| F 5 | ○   | ○   |     |    |    |    |    | 1 : 1.00   |
| F 6 |     | ○   |     | ○  |    |    |    | 1 : 0.81   |
| F 7 |     | ○   |     |    | ○  |    |    | 1 : 0.55   |
| R 1 |     |     | ○   |    |    |    | ○  | 1 : −7.02  |
| R 2 |     |     | ○   |    |    | ○  |    | 1 : −4.14  |
| R 3 |     |     | ○   |    | ○  |    |    | 1 : −1.31  |

FIG. 1C

| A | B | X1 | | | | X2 | | | | X3 | | | |
|---|---|------|------|------|------|------|------|------|------|------|------|------|------|
|   |   | S1 | C1 | RG1 | P1 | S2 | C2 | RG2 | P2 | S3 | C3 | RG3 | P3 |
| F1 | N | -1.08 | -0.32 | 0.0 | 1.10 | 1.00 | 0.00 | -0.32 | -0.94 | 1.00 | 0.26 | 0.00 | -0.81 |
|    | W | 0.0 | 0.0 | 0.0 | 0.0 | 0.0 | 0.0 | 0.0 | 0.0 | 2.82 | 5.63 | 2.82 | 2.82 |
| F2 | N | -0.58 | 0.0 | 0.24 | 0.83 | 1.00 | 0.24 | 0.0 | -0.71 | 1.00 | 0.44 | 0.24 | -0.62 |
|    | W | 0.0 | 0.0 | 0.0 | 0.0 | 1.27 | 2.54 | 1.27 | 1.27 | 1.67 | 3.35 | 1.67 | 1.67 |
| F3 | N | 0.0 | 0.37 | 0.52 | 0.53 | 1.00 | 0.52 | 0.37 | -0.45 | 1.00 | 0.65 | 0.52 | -0.39 |
|    | W | 1.31 | 2.62 | 1.31 | 1.31 | 1.86 | 3.71 | 1.86 | 1.86 | 1.14 | 2.29 | 1.14 | 1.14 |
| F5 | N | 0.0 | 0.70 | 1.00 | 1.02 | 1.92 | 1.00 | 0.70 | -0.87 | 1.92 | 1.24 | 1.00 | -0.75 |
|    | W | 0.46 | 0.93 | 0.46 | 0.46 | 0.66 | 1.32 | 0.66 | 0.66 | 0.59 | 1.19 | 0.59 | 0.59 |
| F6 | N | -2.39 | 0.0 | 1.00 | 3.44 | 4.13 | 1.00 | 0.0 | -2.94 | 4.13 | 1.82 | 1.00 | -2.54 |
|    | W | 0.0 | 0.00 | 0.00 | 0.00 | 0.45 | 0.90 | 0.45 | 0.45 | 0.41 | 0.81 | 0.41 | 0.41 |
| R1 | N | 1.00 | 0.30 | 0.0 | -1.02 | -0.92 | 0.0 | 0.30 | 0.87 | -0.92 | -0.24 | 0.0 | 0.75 |
|    | W | 2.39 | 4.77 | 2.39 | 2.39 | 3.39 | 6.77 | 3.39 | 3.39 | 3.05 | 6.11 | 3.05 | 3.05 |
| R2 | N | 1.00 | 0.00 | -0.42 | -1.44 | -1.73 | -0.42 | 0.00 | 1.23 | -1.73 | -0.76 | -0.42 | 1.06 |
|    | W | 2.39 | 4.77 | 2.39 | 2.39 | 1.07 | 2.15 | 1.07 | 1.07 | 0.97 | 1.94 | 0.97 | 0.97 |

FIG.2C

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | -1.30 | -0.46 | -0.10 | 1.22 | 1.00 | -0.10 | -0.46 | -1.04 | 1.00 | 0.19 | -0.10 | -0.90 | 0.19 | 0.00 | -0.10 | -0.48 |
| | W | 0.0 | 0.00 | 0.00 | 0.00 | 0.0 | 0.00 | 0.00 | 0.00 | 2.82 | 5.63 | 2.82 | 2.82 | 2.82 | 5.63 | 2.82 | 2.82 |
| F2 | N | -1.08 | -0.32 | 0.0 | 1.10 | 1.00 | 0.00 | -0.32 | -0.94 | 1.00 | 0.26 | 0.00 | -0.81 | 0.26 | 0.09 | 0.00 | -0.43 |
| | W | 0.0 | 0.0 | 0.0 | 0.0 | 0.0 | 0.00 | 0.0 | 0.0 | 2.82 | 5.63 | 2.82 | 2.82 | 0.0 | 0.0 | 0.0 | 0.0 |
| F3 | N | -0.58 | 0.0 | 0.24 | 0.83 | 1.00 | 0.24 | 0.0 | -0.71 | 1.00 | 0.44 | 0.24 | -0.62 | 0.44 | 0.31 | 0.24 | -0.33 |
| | W | 0.0 | 0.0 | 0.0 | 0.0 | 1.27 | 2.54 | 1.27 | 1.27 | 1.67 | 3.35 | 1.67 | 1.67 | 0.0 | 0.0 | 0.0 | 0.0 |
| F4 | N | 0.0 | 0.37 | 0.52 | 0.53 | 1.00 | 0.52 | 0.37 | -0.45 | 1.00 | 0.65 | 0.52 | -0.39 | 0.65 | 0.57 | 0.52 | -0.21 |
| | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F6 | N | 0.0 | 0.70 | 1.00 | 1.02 | 1.92 | 1.00 | 0.70 | -0.87 | 1.92 | 1.24 | 1.00 | -0.75 | 1.24 | 1.09 | 1.00 | -0.40 |
| | W | 0.46 | 0.93 | 0.46 | 0.46 | 0.66 | 1.32 | 0.66 | 0.66 | 0.59 | 1.19 | 0.59 | 0.59 | 0.0 | 0.0 | 0.0 | 0.0 |
| F7 | N | -2.39 | 0.0 | 1.00 | 3.44 | 4.13 | 1.00 | 0.0 | -2.94 | 4.13 | 1.82 | 1.00 | -2.54 | 1.82 | 1.29 | 1.00 | -1.35 |
| | W | 0.0 | 0.0 | 0.0 | 0.00 | 0.45 | 0.90 | 0.45 | 0.45 | 0.41 | 0.81 | 0.41 | 0.41 | 0.0 | 0.0 | 0.0 | 0.0 |
| R1 | N | 1.00 | 0.35 | 0.08 | -0.94 | -0.77 | 0.08 | 0.35 | 0.80 | -0.77 | -0.14 | 0.08 | 0.69 | -0.14 | 0.00 | 0.08 | 0.37 |
| | W | 2.39 | 4.77 | 2.39 | 2.39 | 3.39 | 6.77 | 3.39 | 3.39 | 3.05 | 6.11 | 3.05 | 3.05 | 5.14 | 10.27 | 5.14 | 5.14 |
| R2 | N | 1.00 | 0.30 | 0.0 | -1.02 | -0.92 | 0.0 | 0.30 | 0.87 | -0.92 | -0.24 | 0.0 | 0.75 | -0.24 | -0.09 | 0.0 | 0.40 |
| | W | 2.39 | 4.77 | 2.39 | 2.39 | 3.39 | 6.77 | 3.39 | 3.39 | 3.05 | 6.11 | 3.05 | 3.05 | 0.0 | 0.0 | 0.0 | 0.0 |
| R3 | N | 1.00 | 0.00 | -0.42 | -1.44 | -1.73 | -0.42 | 0.00 | 1.23 | -1.73 | -0.76 | -0.42 | 1.06 | -0.76 | -0.54 | -0.42 | 0.56 |
| | W | 2.39 | 4.77 | 2.39 | 2.39 | 1.07 | 2.15 | 1.07 | 1.07 | 0.97 | 1.94 | 0.97 | 0.97 | 0.0 | 0.0 | 0.0 | 0.0 |

FIG. 3B

|     | CL1 | CL2 | CL3 | B1 | B2 | B3 | B4 | GEAR RATIO |
|-----|-----|-----|-----|----|----|----|----|------------|
| F1  | ○   |     |     |    |    |    | ○  | 1 :  8.83  |
| F2  | ○   |     |     |    |    | ○  |    | 1 :  3.82  |
| F3  | ○   |     |     |    | ○  |    |    | 1 :  2.27  |
| F4  | ○   |     |     | ○  |    |    |    | 1 :  1.55  |
| F5  | ○   | ○   |     |    |    |    |    | 1 :  1.00  |
| F6  |     | ○   |     | ○  |    |    |    | 1 :  0.81  |
| F7  |     | ○   |     |    | ○  |    |    | 1 :  0.55  |
| R1  |     |     | ○   |    |    |    | ○  | 1 : −13.28 |
| R2  |     |     | ○   |    |    | ○  |    | 1 : −4.14  |
| R3  |     |     | ○   |    | ○  |    |    | 1 : −1.31  |
|     |     |     |     |    |    |    |    |            |

FIG. 4B

|     | CL1 | CL2 | CL3 | B1 | B2 | B3 | B4 | GEAR RATIO |
|-----|-----|-----|-----|----|----|----|----|------------|
| F1  | ○   |     |     |    |    | ○  |    | 1 :  3.82  |
| F2  | ○   |     |     |    | ○  |    |    | 1 :  2.27  |
| F3  | ○   |     |     |    |    |    | ○  | 1 :  2.01  |
| F4  | ○   |     |     | ○  |    |    |    | 1 :  1.55  |
| F5  | ○   | ○   |     |    |    |    |    | 1 :  1.00  |
| F6  |     | ○   |     | ○  |    |    |    | 1 :  0.81  |
| F7  |     | ○   |     |    |    |    | ○  | 1 :  0.64  |
| F8  |     | ○   |     |    | ○  |    |    | 1 :  0.55  |
| R1  |     |     | ○   |    |    | ○  |    | 1 : −4.14  |
| R2  |     |     | ○   |    | ○  |    |    | 1 : −1.31  |
| R3  |     |     | ○   |    |    |    |    | 1 : −0.85  |

FIG.3C

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | -1.50 | -0.59 | -0.20 | 1.32 | 1.00 | -0.20 | -0.59 | -1.13 | 1.00 | 0.11 | -0.20 | -0.98 | -0.20 | 0.00 | 0.11 | 0.52 |
| | W | 0.0 | 0.00 | 0.00 | 0.00 | 0.0 | 0.00 | 0.00 | 0.00 | 2.82 | 5.63 | 2.82 | 2.82 | 5.01 | 10.02 | 5.01 | 5.01 |
| F2 | N | -1.08 | -0.32 | 0.0 | 1.10 | 1.00 | 0.00 | -0.32 | -0.94 | 1.00 | 0.26 | 0.00 | -0.81 | 0.00 | 0.17 | 0.26 | 0.43 |
| | W | 0.0 | 0.0 | 0.0 | 0.0 | 0.0 | 0.0 | 0.0 | 0.0 | 2.82 | 5.63 | 2.82 | 2.82 | 0.0 | 0.0 | 0.0 | 0.0 |
| F3 | N | -0.58 | 0.0 | 0.24 | 0.83 | 1.00 | 0.24 | 0.0 | -0.71 | 1.00 | 0.44 | 0.24 | -0.62 | 0.24 | 0.37 | 0.44 | 0.33 |
| | W | 0.0 | 0.0 | 0.0 | 0.0 | 1.27 | 2.54 | 1.27 | 1.27 | 1.67 | 3.35 | 1.67 | 1.67 | 0.0 | 0.0 | 0.0 | 0.0 |
| F4 | N | 0.0 | 0.37 | 0.52 | 0.53 | 1.00 | 0.52 | 0.37 | -0.45 | 1.00 | 0.65 | 0.52 | -0.39 | 0.52 | 0.60 | 0.65 | 0.21 |
| | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F6 | N | 0.0 | 0.70 | 1.00 | 1.02 | 1.92 | 1.00 | 0.70 | -0.87 | 1.92 | 1.24 | 1.00 | -0.75 | 1.00 | 1.15 | 1.24 | 0.40 |
| | W | 0.46 | 0.93 | 0.46 | 0.46 | 0.66 | 1.32 | 0.66 | 0.66 | 0.59 | 1.19 | 0.59 | 0.59 | 0.0 | 0.0 | 0.0 | 0.0 |
| F7 | N | -2.39 | 0.0 | 1.00 | 3.44 | 4.13 | 1.00 | 0.0 | -2.94 | 4.13 | 1.82 | 1.00 | -2.54 | 1.00 | 1.52 | 1.82 | 1.35 |
| | W | 0.0 | 0.00 | 0.00 | 0.00 | 0.45 | 0.90 | 0.45 | 0.45 | 0.41 | 0.81 | 0.41 | 0.41 | 0.0 | 0.0 | 0.0 | 0.0 |
| R1 | N | 1.00 | 0.39 | 0.13 | -0.88 | -0.67 | 0.13 | 0.39 | 0.75 | -0.67 | -0.08 | 0.13 | 0.65 | 0.13 | 0.00 | -0.08 | -0.34 |
| | W | 2.39 | 4.77 | 2.39 | 2.39 | 3.39 | 6.77 | 3.39 | 3.39 | 3.05 | 6.11 | 3.05 | 3.05 | 9.14 | 18.28 | 9.14 | 9.14 |
| R2 | N | 1.00 | 0.30 | 0.0 | -1.02 | -0.92 | 0.0 | 0.30 | 0.87 | -0.92 | -0.24 | 0.0 | 0.75 | 0.0 | -0.15 | -0.24 | -0.40 |
| | W | 2.39 | 4.77 | 2.39 | 2.39 | 3.39 | 6.77 | 3.39 | 3.39 | 3.05 | 6.11 | 3.05 | 3.05 | 0.0 | 0.0 | 0.0 | 0.0 |
| R3 | N | 1.00 | 0.00 | -0.42 | -1.44 | -1.73 | -0.42 | 0.00 | 1.23 | -1.73 | -0.76 | -0.42 | 1.06 | -0.42 | -0.64 | -0.76 | -0.56 |
| | W | 2.39 | 4.77 | 2.39 | 2.39 | 1.07 | 2.15 | 1.07 | 1.07 | 0.97 | 1.94 | 0.97 | 0.97 | 0.0 | 0.0 | 0.0 | 0.0 |

FIG. 4C

| A | B | X1 | | | X2 | | | X3 | | | X4 | | | |
|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |

| A | B | S1 | C1 | RG1 | P1 | S2 | C2 | RG2 | P2 | S3 | C3 | RG3 | P3 | S4 | C4 | RG4 | P4 |
|---|---|---|---|---|---|---|---|---|---|---|---|---|---|---|---|---|---|
| F1 | N | -1.08 | -0.32 | 0.0 | 1.10 | 1.00 | 0.00 | -0.32 | -0.94 | 1.00 | 0.26 | 0.00 | -0.81 | -0.47 | 0.00 | 0.26 | 1.20 |
| | W | 0.0 | 0.0 | 0.0 | 0.0 | 0.0 | 0.0 | 0.0 | 0.0 | 2.82 | 5.63 | 2.82 | 2.82 | 0.0 | 0.0 | 0.0 | 0.0 |
| F2 | N | -0.58 | 0.0 | 0.24 | 0.83 | 1.00 | 0.24 | 0.0 | -0.71 | 1.00 | 0.44 | 0.24 | -0.62 | -0.11 | 0.24 | 0.44 | 0.91 |
| | W | 0.0 | 0.0 | 0.0 | 0.0 | 1.27 | 2.54 | 1.27 | 1.27 | 1.67 | 3.35 | 1.67 | 1.67 | 0.0 | 0.0 | 0.0 | 0.0 |
| F3 | N | -0.42 | 0.10 | 0.32 | 0.75 | 1.00 | 0.32 | 0.10 | -0.64 | 1.00 | 0.50 | 0.32 | -0.55 | 0.0 | 0.00 | 0.50 | 0.82 |
| | W | 0.0 | 0.00 | 0.00 | 0.00 | 0.00 | 0.00 | 0.00 | 0.00 | 2.82 | 5.63 | 2.82 | 2.82 | 1.80 | 3.61 | 1.80 | 1.80 |
| F4 | N | 0.0 | 0.37 | 0.52 | 0.53 | 1.00 | 0.52 | 0.37 | -0.45 | 1.00 | 0.65 | 0.52 | -0.39 | 0.30 | 0.52 | 0.65 | 0.57 |
| | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F6 | N | 0.0 | 0.70 | 1.00 | 1.02 | 1.92 | 1.00 | 0.70 | -0.87 | 1.92 | 1.24 | 1.00 | -0.75 | 0.57 | 1.00 | 1.24 | 1.10 |
| | W | 0.46 | 0.93 | 0.46 | 0.46 | 0.66 | 1.32 | 0.66 | 0.66 | 0.59 | 1.19 | 0.59 | 0.59 | 0.0 | 0.0 | 0.0 | 0.0 |
| F7 | N | -1.32 | 0.31 | 1.00 | 2.36 | 3.15 | 1.00 | 0.31 | -2.02 | 3.15 | 1.56 | 1.00 | -1.74 | 0.0 | 1.00 | 1.56 | 2.57 |
| | W | 0.0 | 0.00 | 0.00 | 0.00 | 0.00 | 0.00 | 0.00 | 0.00 | 0.00 | 0.00 | 0.00 | 0.00 | 0.64 | 1.28 | 0.64 | 0.64 |
| F8 | N | -2.39 | 0.0 | 1.00 | 3.44 | 4.13 | 1.00 | 0.0 | -2.94 | 4.13 | 1.82 | 1.00 | -2.54 | -0.46 | 1.00 | 1.82 | 3.74 |
| | W | 0.0 | 0.00 | 0.00 | 0.00 | 0.45 | 0.90 | 0.45 | 0.45 | 0.41 | 0.81 | 0.41 | 0.41 | 0.43 | 0.0 | 0.0 | 0.0 |
| R1 | N | 1.00 | 0.30 | 0.0 | -1.02 | -0.92 | 0.0 | 0.30 | 0.87 | -0.92 | -0.24 | 0.0 | 0.75 | 0.19 | 0.0 | -0.24 | -1.10 |
| | W | 2.39 | 4.77 | 2.39 | 2.39 | 3.39 | 6.77 | 3.39 | 3.39 | 3.05 | 6.11 | 3.05 | 3.05 | 0.0 | 0.0 | 0.0 | 0.0 |
| R2 | N | 1.00 | 0.00 | -0.42 | -1.44 | -1.73 | -0.42 | 0.00 | 1.23 | -1.73 | -0.76 | -0.42 | 1.06 | 0.0 | -0.42 | -0.76 | -1.57 |
| | W | 2.39 | 4.77 | 2.39 | 2.39 | 1.07 | 2.15 | 1.07 | 1.07 | 0.97 | 1.94 | 0.97 | 0.97 | 0.64 | 0.0 | 0.0 | 0.0 |
| R3 | N | 1.00 | -0.24 | -0.75 | -1.78 | -2.37 | -0.75 | -0.24 | 1.52 | -2.37 | -1.18 | -0.75 | 1.32 | 0.0 | -0.75 | -1.18 | -1.94 |
| | W | 2.39 | 4.77 | 2.39 | 2.39 | 3.39 | 6.77 | 3.39 | 3.39 | 3.05 | 6.11 | 3.05 | 3.05 | 3.29 | 6.58 | 3.29 | 3.29 |

FIG. 5B

|     | CL1 | CL2 | CL3 | B1 | B2 | B3 | B4 | GEAR RATIO |
|-----|-----|-----|-----|----|----|----|----|------------|
| F1  | ○   |     |     |    |    | ○  |    | 1 : 3.82   |
| F2  | ○   |     |     |    |    |    | ○  | 1 : 2.80   |
| F3  | ○   |     |     |    | ○  |    |    | 1 : 2.27   |
| F4  | ○   |     |     | ○  |    |    |    | 1 : 1.55   |
| F5  | ○   | ○   |     |    |    |    |    | 1 : 1.00   |
| F6  |     | ○   |     | ○  |    |    |    | 1 : 0.81   |
| F7  |     | ○   |     |    | ○  |    |    | 1 : 0.55   |
| R1  |     |     | ○   |    |    | ○  |    | 1 : −4.14  |
| R2  |     |     | ○   |    |    |    | ○  | 1 : −2.29  |
| R3  |     |     | ○   |    | ○  |    |    | 1 : −1.31  |

FIG. 6B

|     | CL1 | CL2 | CL3 | B1 | B2 | B3 | B4 | GEAR RATIO |
|-----|-----|-----|-----|----|----|----|----|------------|
| F1  |     |     | ○   |    |    |    | ○  | 1 : 12.75  |
| F2  | ○   |     |     |    |    | ○  |    | 1 : 3.82   |
| F3  |     | ○   |     |    |    |    | ○  | 1 : 3.29   |
| F4  | ○   |     |     |    | ○  |    |    | 1 : 2.27   |
| F5  | ○   |     |     | ○  |    |    |    | 1 : 1.55   |
| F6  | ○   | ○   |     |    |    |    |    | 1 : 1.00   |
| F7  |     | ○   |     | ○  |    |    |    | 1 : 0.81   |
| F8  |     | ○   |     |    | ○  |    |    | 1 : 0.55   |
| R1  | ○   |     |     |    |    |    | ○  | 1 : −5.45  |
| R2  |     |     | ○   |    |    | ○  |    | 1 : −4.14  |
| R3  |     |     | ○   |    | ○  |    |    | 1 : −1.31  |

FIG. 5C

| A | B | X1 | | | X2 | | | X3 | | | X4 | | | |
|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |

| A | B | S1 | C1 | RG1 | P1 | S2 | C2 | RG2 | P2 | S3 | C3 | RG3 | P3 | S4 | C4 | RG4 | P4 |
|---|---|---|---|---|---|---|---|---|---|---|---|---|---|---|---|---|---|
| F1 | N | -1.08 | -0.32 | 0.0 | 1.10 | 1.00 | 0.00 | -0.32 | -0.94 | 1.00 | 0.26 | 0.00 | -0.81 | 0.26 | 0.00 | -0.15 | -0.67 |
| | W | 0.0 | 0.0 | 0.0 | 0.0 | 0.0 | 0.0 | 0.0 | 0.0 | 2.82 | 5.63 | 2.82 | 2.82 | 0.0 | 0.0 | 0.0 | 0.0 |
| F2 | N | -0.82 | -0.15 | 0.13 | 0.96 | 1.00 | 0.13 | -0.15 | -0.82 | 1.00 | 0.36 | 0.13 | -0.71 | 0.36 | 0.13 | 0.0 | -0.59 |
| | W | 0.0 | 0.0 | 0.0 | 0.0 | 0.0 | 0.0 | 0.0 | 0.0 | 2.82 | 5.63 | 2.82 | 2.82 | 1.80 | 3.61 | 1.80 | 1.80 |
| F3 | N | -0.58 | 0.0 | 0.24 | 0.83 | 1.00 | 0.24 | 0.0 | -0.71 | 1.00 | 0.44 | 0.24 | -0.62 | 0.44 | 0.24 | 0.13 | -0.51 |
| | W | 0.0 | 0.0 | 0.0 | 0.0 | 1.27 | 2.54 | 1.27 | 1.27 | 1.67 | 3.35 | 1.67 | 1.67 | 0.0 | 0.0 | 0.0 | 0.0 |
| F4 | N | 0.0 | 0.37 | 0.52 | 0.53 | 1.00 | 0.52 | 0.37 | -0.45 | 1.00 | 0.65 | 0.52 | -0.39 | 0.65 | 0.52 | 0.45 | -0.32 |
| | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F6 | N | 0.0 | 0.70 | 1.00 | 1.02 | 1.92 | 1.00 | 0.70 | -0.87 | 1.92 | 1.24 | 1.00 | -0.75 | 1.24 | 1.00 | 0.86 | -0.62 |
| | W | 0.46 | 0.93 | 0.46 | 0.46 | 0.66 | 1.32 | 0.66 | 0.66 | 0.59 | 1.19 | 0.59 | 0.59 | 0.0 | 0.0 | 0.0 | 0.0 |
| F7 | N | -2.39 | 0.0 | 1.00 | 3.44 | 4.13 | 1.00 | 0.0 | -2.94 | 4.13 | 1.82 | 1.00 | -2.54 | 1.82 | 1.00 | 0.54 | -2.10 |
| | W | 0.0 | 0.00 | 0.00 | 0.00 | 0.45 | 0.90 | 0.45 | 0.45 | 0.41 | 0.81 | 0.41 | 0.41 | 0.0 | 0.0 | 0.0 | 0.0 |
| R1 | N | 1.00 | 0.30 | 0.0 | -1.02 | -0.92 | 0.0 | 0.30 | 0.87 | -0.92 | -0.24 | 0.0 | 0.75 | -0.24 | 0.0 | 0.14 | 0.62 |
| | W | 2.39 | 4.77 | 2.39 | 2.39 | 3.39 | 6.77 | 3.39 | 3.39 | 3.05 | 6.11 | 3.05 | 3.05 | 0.0 | 0.0 | 0.0 | 0.0 |
| R2 | N | 1.00 | 0.18 | -0.16 | -1.18 | -1.23 | -0.16 | 0.18 | 1.01 | -1.23 | -0.44 | -0.16 | 0.87 | -0.44 | -0.16 | 0.0 | 0.72 |
| | W | 2.39 | 4.77 | 2.39 | 2.39 | 3.39 | 6.77 | 3.39 | 3.39 | 3.05 | 6.11 | 3.05 | 3.05 | 3.29 | 6.58 | 3.29 | 3.29 |
| R3 | N | 1.00 | 0.00 | -0.42 | -1.44 | -1.73 | -0.42 | 0.00 | 1.23 | -1.73 | -0.76 | -0.42 | 1.06 | -0.76 | -0.42 | -0.23 | 0.88 |
| | W | 2.39 | 4.77 | 2.39 | 2.39 | 1.07 | 2.15 | 1.07 | 1.07 | 0.97 | 1.94 | 0.97 | 0.97 | 0.0 | 0.0 | 0.0 | 0.0 |

FIG. 6C

| A \ B | | S1 | C1 | RG1 | P1 | S2 | C2 | RG2 | P2 | S3 | C3 | RG3 | P3 | S4 | C4 | RG4 | P4 |
|---|---|---|---|---|---|---|---|---|---|---|---|---|---|---|---|---|---|
| | | X1 | | | | X2 | | | | X3 | | | | X4 | | | |
| F1 | N | 1.00 | 0.48 | 0.26 | -0.75 | -0.43 | 0.26 | 0.48 | 0.64 | -0.43 | 0.08 | 0.26 | 0.56 | 0.26 | 0.08 | 0.0 | -0.28 |
| F1 | W | 2.39 | 4.77 | 2.39 | 2.39 | 3.39 | 6.77 | 3.39 | 3.39 | 3.05 | 6.11 | 3.05 | 3.05 | 11.75 | 23.51 | 11.75 | 11.75 |
| F2 | N | -1.08 | -0.32 | 0.0 | 1.10 | 1.00 | 0.00 | -0.32 | -0.94 | 1.00 | 0.26 | 0.00 | -0.81 | 0.00 | 0.26 | 0.38 | 0.41 |
| F2 | W | 0.0 | 0.0 | 0.0 | 0.0 | 0.0 | 0.0 | 0.0 | 0.0 | 2.82 | 5.63 | 2.82 | 2.82 | 0.0 | 0.0 | 0.0 | 0.0 |
| F3 | N | 3.88 | 1.85 | 1.00 | -2.93 | -1.66 | 1.00 | 1.85 | 2.50 | -1.66 | 0.30 | 1.00 | 2.16 | 1.00 | 0.30 | 0.0 | -1.08 |
| F3 | W | 0.0 | 0.00 | 0.00 | 0.00 | 0.00 | 0.00 | 0.00 | 0.00 | 0.00 | 0.00 | 0.00 | 0.00 | 2.29 | 4.58 | 2.29 | 2.29 |
| F4 | N | -0.58 | 0.0 | 0.24 | 0.83 | 1.00 | 0.24 | 0.0 | -0.71 | 1.00 | 0.44 | 0.24 | -2.62 | 0.24 | 0.44 | 0.53 | 0.31 |
| F4 | W | 0.0 | 0.0 | 0.0 | 0.0 | 1.27 | 2.54 | 1.27 | 1.27 | 1.67 | 3.35 | 1.67 | 1.67 | 0.0 | 0.0 | 0.0 | 0.0 |
| F5 | N | 0.0 | 0.37 | 0.52 | 0.53 | 1.00 | 0.52 | 0.37 | -0.45 | 1.00 | 0.65 | 0.52 | -0.39 | 0.52 | 0.65 | 0.70 | 0.20 |
| F5 | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F7 | N | 0.0 | 0.70 | 1.00 | 1.02 | 1.92 | 1.00 | 0.70 | -0.87 | 1.92 | 1.24 | 1.00 | -0.75 | 1.00 | 1.24 | 1.35 | 0.38 |
| F7 | W | 0.46 | 0.93 | 0.46 | 0.46 | 0.66 | 1.32 | 0.66 | 0.66 | 0.59 | 1.19 | 0.59 | 0.59 | 0.0 | 0.0 | 0.0 | 0.0 |
| F8 | N | -2.39 | 0.0 | 1.00 | 3.44 | 4.12 | 1.00 | 0.0 | -2.94 | 4.12 | 1.82 | 1.00 | -2.54 | 1.00 | 1.82 | 2.18 | 1.27 |
| F8 | W | 0.0 | 0.00 | 0.00 | 0.00 | 0.45 | 0.90 | 0.45 | 0.45 | 0.41 | 0.81 | 0.41 | 0.41 | 0.0 | 0.0 | 0.0 | 0.0 |
| R1 | N | -2.34 | -1.12 | -0.60 | 1.77 | 1.00 | -0.60 | -1.12 | -1.51 | 1.00 | -0.18 | -0.60 | -1.30 | -0.60 | -0.18 | 0.0 | 0.65 |
| R1 | W | 0.0 | 0.00 | 0.00 | 0.00 | 0.0 | 0.00 | 0.00 | 0.00 | 2.82 | 5.63 | 2.82 | 2.82 | 6.45 | 12.89 | 6.45 | 6.45 |
| R2 | N | 1.00 | 0.30 | 0.0 | -1.02 | -0.92 | 0.00 | 0.30 | 0.87 | -0.92 | 0.24 | 0.00 | 0.75 | 0.00 | -0.24 | -0.35 | -0.38 |
| R2 | W | 2.39 | 4.77 | 2.39 | 2.39 | 3.39 | 6.77 | 3.39 | 3.39 | 3.05 | 6.11 | 3.05 | 3.05 | 0.00 | 0.0 | 0.0 | 0.0 |
| R3 | N | 1.00 | 0.00 | -0.42 | -1.44 | -1.73 | -0.42 | 0.00 | 1.23 | -1.73 | -0.76 | -0.42 | 1.06 | -0.42 | -0.76 | -0.91 | -0.53 |
| R3 | W | 2.39 | 4.77 | 2.39 | 2.39 | 1.07 | 2.15 | 1.07 | 1.07 | 0.97 | 1.94 | 0.97 | 0.97 | 0.0 | 0.0 | 0.0 | 0.0 |

FIG. 7C

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 1.00 | 0.58 | 0.40 | -0.61 | -0.15 | 0.40 | 0.58 | 0.52 | -0.15 | 0.26 | 0.40 | 0.45 | 0.0 | 0.26 | 0.40 | 0.66 |
| | W | 2.39 | 4.77 | 2.39 | 2.39 | 3.39 | 6.77 | 3.39 | 3.39 | 3.05 | 6.11 | 3.05 | 3.05 | 5.14 | 10.27 | 5.14 | 5.14 |
| F2 | N | -1.08 | -0.32 | 0.0 | 1.10 | 1.00 | 0.00 | -0.32 | -0.94 | 1.00 | 0.26 | 0.00 | -0.81 | 0.73 | 0.26 | 0.00 | -1.20 |
| | W | 0.0 | 0.0 | 0.0 | 0.0 | 0.0 | 0.0 | 0.0 | 0.0 | 2.82 | 5.63 | 2.82 | 2.82 | 0.0 | 0.0 | 0.0 | 0.0 |
| F3 | N | -0.58 | 0.0 | 0.24 | 0.83 | 1.00 | 0.24 | 0.0 | -0.71 | 1.00 | 0.44 | 0.24 | -0.62 | 0.79 | 0.44 | 0.24 | -0.91 |
| | W | 0.0 | 0.0 | 0.0 | 0.0 | 1.27 | 2.54 | 1.27 | 1.27 | 1.67 | 3.35 | 1.67 | 1.67 | 0.0 | 0.0 | 0.0 | 0.0 |
| F4 | N | 2.49 | 1.44 | 1.00 | -1.51 | -0.37 | 1.00 | 1.44 | 1.29 | -0.37 | 0.64 | 1.00 | 1.12 | 0.0 | 0.64 | 1.00 | 1.64 |
| | W | 0.0 | 0.00 | 0.00 | 0.00 | 0.00 | 0.00 | 0.00 | 0.00 | 0.00 | 0.00 | 0.00 | 0.00 | 1.00 | 2.00 | 1.00 | 1.00 |
| F5 | N | 0.0 | 0.37 | 0.52 | 0.53 | 1.00 | 0.52 | 0.37 | -0.45 | 1.00 | 0.65 | 0.52 | -0.39 | 0.87 | 0.65 | 0.52 | -0.57 |
| | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F7 | N | 0.0 | 0.70 | 1.00 | 1.02 | 1.92 | 1.00 | 0.70 | -0.87 | 1.92 | 1.24 | 1.00 | -0.75 | 1.67 | 1.24 | 1.00 | -1.10 |
| | W | 0.46 | 0.93 | 0.43 | 0.46 | 0.66 | 1.32 | 0.66 | 0.66 | 0.59 | 1.19 | 0.59 | 0.59 | 0.0 | 0.0 | 0.0 | 0.0 |
| F8 | N | -2.39 | 0.0 | 1.00 | 3.44 | 4.13 | 1.00 | 0.0 | -2.94 | 4.13 | 1.82 | 1.00 | -2.54 | 3.28 | 1.82 | 1.00 | -3.74 |
| | W | 0.0 | 0.00 | 0.00 | 0.00 | 0.45 | 0.90 | 0.45 | 0.45 | 0.41 | 0.81 | 0.41 | 0.41 | 0.0 | 0.0 | 0.0 | 0.0 |
| R1 | N | 1.00 | 0.30 | 0.0 | -1.02 | -0.92 | 0.0 | 0.30 | 0.87 | -0.92 | -0.24 | 0.0 | 0.75 | -0.67 | -0.24 | 0.0 | 1.10 |
| | W | 2.39 | 4.77 | 2.39 | 2.39 | 3.39 | 6.77 | 3.39 | 3.39 | 3.05 | 6.11 | 3.05 | 3.05 | 0.0 | 0.0 | 0.0 | 0.0 |
| R2 | N | 1.00 | 0.00 | -0.42 | -1.44 | -1.73 | -0.42 | 0.00 | 1.23 | -1.73 | -0.76 | -0.42 | 1.06 | -1.37 | -0.76 | -0.42 | 1.57 |
| | W | 2.39 | 4.77 | 2.39 | 2.39 | 1.07 | 2.15 | 1.07 | 1.07 | 0.97 | 1.94 | 0.97 | 0.97 | 0.0 | 0.0 | 0.0 | 0.0 |

FIG. 7B

|    | CL1 | CL2 | CL3 | B1 | B2 | B3 | B4 | GEAR RATIO |
|----|-----|-----|-----|----|----|----|----|------------|
| F1 |     |     | ○   |    |    |    | ○  | 1 : 3.89   |
| F2 | ○   |     |     |    |    | ○  |    | 1 : 3.82   |
| F3 | ○   |     |     |    | ○  |    |    | 1 : 2.27   |
| F4 |     | ○   |     |    |    |    | ○  | 1 : 1.56   |
| F5 | ○   |     |     | ○  |    |    |    | 1 : 1.55   |
| F6 | ○   | ○   |     |    |    |    |    | 1 : 1.00   |
| F7 |     | ○   |     | ○  |    |    |    | 1 : 0.81   |
| F8 |     | ○   |     |    | ○  |    |    | 1 : 0.55   |
| R1 |     |     | ○   |    |    | ○  |    | 1 : −4.14  |
| R2 |     |     | ○   |    | ○  |    |    | 1 : −1.31  |

FIG. 8B

|    | CL1 | CL2 | CL3 | B1 | B2 | B3 | B4 | GEAR RATIO |
|----|-----|-----|-----|----|----|----|----|------------|
| F1 | ○   |     |     |    |    | ○  |    | 1 : 3.82   |
| F2 | ○   |     |     |    | ○  |    |    | 1 : 2.27   |
| F3 | ○   |     |     | ○  |    |    |    | 1 : 1.55   |
| F4 | ○   |     |     |    |    |    | ○  | 1 : 1.28   |
| F5 | ○   | ○   |     |    |    |    |    | 1 : 1.00   |
| F6 |     | ○   |     |    |    |    | ○  | 1 : 0.90   |
| F7 |     | ○   |     | ○  |    |    |    | 1 : 0.81   |
| F8 |     |     | ○   |    |    |    | ○  | 1 : 0.49   |
| R1 |     |     | ○   |    |    | ○  |    | 1 : −4.14  |
| R2 |     |     | ○   |    | ○  |    |    | 1 : −1.31  |

FIG. 8C

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | -1.08 | -0.32 | 0.0 | 1.10 | 1.00 | 0.66 | -0.32 | -0.94 | 1.00 | 0.26 | 0.00 | -0.81 | -2.37 | 0.26 | 1.00 | 2.05 |
| | W | 0.0 | 0.00 | 0.00 | 0.00 | 0.00 | 0.00 | 0.00 | 0.00 | 2.82 | 5.63 | 2.82 | 2.82 | 0.0 | 0.0 | 0.0 | 0.0 |
| F2 | N | -0.58 | 0.0 | 0.24 | 0.83 | 1.00 | 0.24 | 0.0 | -0.71 | 1.00 | 0.44 | 0.24 | -0.62 | -1.56 | 0.44 | 1.00 | 1.55 |
| | W | 0.0 | 0.00 | 0.00 | 0.00 | 1.27 | 2.54 | 1.27 | 1.27 | 1.67 | 3.35 | 1.67 | 1.67 | 0.0 | 0.00 | 0.00 | 0.00 |
| F3 | N | 0.0 | 0.37 | 0.52 | 0.53 | 1.00 | 0.52 | 0.37 | -0.45 | 1.00 | 0.65 | 0.52 | -0.39 | -0.62 | 0.65 | 1.00 | 0.98 |
| | W | 1.31 | 2.62 | 1.31 | 1.31 | 1.86 | 3.71 | 1.86 | 1.86 | 1.14 | 2.29 | 1.14 | 1.14 | 0.0 | 0.0 | 0.0 | 0.0 |
| F4 | N | 0.38 | 0.61 | 0.70 | 0.33 | 1.00 | 0.70 | 0.61 | -0.28 | 1.00 | 0.73 | 0.70 | -0.24 | 0.0 | 0.78 | 1.00 | 0.61 |
| | W | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| F6 | N | 0.54 | 0.87 | 1.00 | 0.46 | 1.42 | 1.00 | 0.87 | -0.40 | 1.42 | 1.11 | 1.00 | -0.34 | 0.0 | 1.11 | 1.42 | 0.86 |
| | W | 0.0 | 0.00 | 0.00 | 0.00 | 0.00 | 0.00 | 0.00 | 0.00 | 1.00 | 2.00 | 1.00 | 1.00 | 0.36 | 0.71 | 0.36 | 0.36 |
| F7 | N | 0.0 | 0.70 | 1.00 | 1.02 | 1.92 | 1.00 | 0.70 | -0.87 | 1.92 | 1.24 | 1.00 | -0.75 | -1.19 | 1.24 | 1.92 | 1.89 |
| | W | 0.46 | 0.93 | 0.46 | 0.46 | 0.66 | 1.32 | 0.66 | 0.66 | 0.59 | 1.19 | 0.59 | 0.59 | 0.0 | 0.00 | 0.00 | 0.00 |
| F8 | N | 1.00 | 1.59 | 1.84 | 0.85 | 2.62 | 1.84 | 1.59 | -0.73 | 2.62 | 2.04 | 1.84 | -0.63 | 0.0 | 2.04 | 2.62 | 1.59 |
| | W | 2.39 | 4.77 | 2.39 | 2.39 | 3.39 | 6.77 | 3.39 | 3.39 | 2.08 | 4.17 | 2.08 | 2.08 | 1.82 | 3.65 | 1.82 | 1.82 |
| R1 | N | 1.00 | 0.30 | 0.0 | -1.02 | -0.92 | 0.0 | 0.30 | 0.87 | -0.92 | -0.24 | 0.0 | 0.75 | 2.19 | -0.24 | -0.92 | -1.89 |
| | W | 2.39 | 4.77 | 2.39 | 2.39 | 3.39 | 6.77 | 3.39 | 3.39 | 3.05 | 6.11 | 3.05 | 3.05 | 0.0 | 0.00 | 0.00 | 0.00 |
| R2 | N | 1.00 | 0.00 | -0.42 | -1.44 | -1.73 | -0.42 | 0.00 | 1.23 | -1.73 | -0.76 | -0.42 | 1.06 | 2.69 | -0.76 | -1.73 | -2.68 |
| | W | 2.39 | 4.77 | 2.39 | 2.39 | 1.07 | 2.15 | 1.07 | 1.07 | 0.97 | 1.94 | 0.97 | 0.97 | 0.0 | 0.00 | 0.00 | 0.00 |

|     | CL1 | CL2 | CL3 | B1 | B2 | B3 | B4 | GEAR RATIO |
|-----|-----|-----|-----|----|----|----|----|------------|
| F1  | ○   |     |     |    |    |    | ○  | 1 : 4.57   |
| F2  | ○   |     |     |    |    | ○  |    | 1 : 3.82   |
| F3  | ○   |     |     |    | ○  |    |    | 1 : 2.27   |
| F4  | ○   |     |     | ○  |    |    |    | 1 : 1.55   |
| F5  | ○   | ○   |     |    |    |    |    | 1 : 1.00   |
| F6  |     | ○   |     | ○  |    |    |    | 1 : 0.81   |
| F7  |     | ○   |     |    | ○  |    |    | 1 : 0.55   |
| R1  |     |     | ○   |    |    |    | ○  | 1 : −5.51  |
| R2  |     |     | ○   |    |    | ○  |    | 1 : −4.14  |
| R3  |     |     | ○   | ○  |    |    |    | 1 : −1.31  |

FIG. 9C

| A | B | _____ X1 _____ | | | | _____ X2 _____ | | | | _____ X3 _____ | | | | _____ X4 _____ | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | -1.21 | -0.40 | -0.06 | 1.17 | 1.00 | -0.06 | -0.40 | -1.00 | 1.00 | 0.22 | -0.06 | -0.86 | 1.00 | 0.22 | 0.0 | -0.61 |
| | W | 0.0 | 0.0 | 0.0 | 0.0 | 0.0 | 0.0 | 0.0 | 0.0 | 0.00 | 0.00 | 0.0 | 0.0 | 3.57 | 7.14 | 3.57 | 3.57 |
| F2 | N | -1.08 | -0.32 | 0.0 | 1.10 | 1.00 | 0.00 | -0.32 | -0.94 | 1.00 | 0.26 | 0.00 | -0.81 | 1.00 | 0.26 | 0.06 | -0.57 |
| | W | 0.0 | 0.0 | 0.0 | 0.0 | 0.0 | 0.0 | 0.0 | 0.0 | 2.82 | 5.63 | 2.82 | 2.82 | 0.00 | 0.0 | 0.0 | 0.0 |
| F3 | N | -0.58 | 0.0 | 0.24 | 0.83 | 1.00 | 0.24 | 0.0 | -0.71 | 1.00 | 0.44 | 0.24 | -0.62 | 1.00 | 0.44 | 0.28 | -0.43 |
| | W | 0.0 | 0.0 | 0.0 | 0.0 | 1.27 | 2.54 | 1.27 | 1.27 | 1.67 | 3.35 | 1.67 | 1.67 | 0.00 | 0.0 | 0.0 | 0.0 |
| F4 | N | 0.0 | 0.37 | 0.52 | 0.53 | 1.00 | 0.52 | 0.37 | -0.45 | 1.00 | 0.65 | 0.52 | -0.39 | 1.00 | 0.65 | 0.55 | -0.28 |
| | W | 1.31 | 2.62 | 1.31 | 1.31 | 1.86 | 3.71 | 1.86 | 1.86 | 1.14 | 2.29 | 1.14 | 1.14 | 0.00 | 0.0 | 0.0 | 0.0 |
| F6 | N | 0.0 | 0.70 | 1.00 | 1.02 | 1.92 | 1.00 | 0.70 | -0.87 | 1.92 | 1.24 | 1.00 | -0.75 | 1.92 | 1.24 | 1.05 | -0.53 |
| | W | 0.46 | 0.93 | 0.46 | 0.46 | 0.66 | 1.32 | 0.66 | 0.66 | 0.59 | 1.19 | 0.59 | 0.59 | 0.00 | 0.0 | 0.0 | 0.0 |
| F7 | N | -2.39 | 0.0 | 1.00 | 3.44 | 4.12 | 1.00 | 0.0 | -2.94 | 4.12 | 1.82 | 1.00 | -2.54 | 4.12 | 1.82 | 1.17 | -1.79 |
| | W | 0.0 | 0.00 | 0.00 | 0.00 | 0.45 | 0.90 | 0.45 | 0.45 | 0.41 | 0.81 | 0.41 | 0.41 | 0.00 | 0.0 | 0.0 | 0.0 |
| R1 | N | 1.00 | 0.33 | 0.05 | -0.97 | -0.83 | 0.05 | 0.33 | 0.83 | -0.83 | -0.18 | 0.05 | 0.71 | -0.83 | -0.18 | 0.0 | 0.50 |
| | W | 2.39 | 4.77 | 2.39 | 2.39 | 3.39 | 6.77 | 3.39 | 3.39 | 2.08 | 4.17 | 2.08 | 2.08 | 6.51 | 13.02 | 6.51 | 6.51 |
| R2 | N | 1.00 | 0.30 | 0.0 | -1.02 | -0.92 | 0.0 | 0.30 | 0.87 | -0.92 | -0.24 | 0.0 | 0.75 | -0.92 | -0.24 | -0.05 | 0.53 |
| | W | 2.39 | 4.77 | 2.39 | 2.39 | 3.39 | 6.77 | 3.39 | 3.39 | 3.05 | 6.11 | 3.05 | 3.05 | 0.00 | 0.0 | 0.0 | 0.0 |
| R3 | N | 1.00 | 0.00 | -0.42 | -1.44 | -1.73 | -0.42 | 0.00 | 1.23 | -1.73 | -0.76 | -0.42 | 1.06 | -1.73 | -0.76 | -0.49 | 0.75 |
| | W | 2.39 | 4.77 | 2.39 | 2.39 | 1.07 | 2.15 | 1.07 | 1.07 | 0.97 | 1.94 | 0.97 | 0.97 | 0.00 | 0.0 | 0.0 | 0.0 |

3,956,946

SPEED CHANGE GEAR SYSTEM

BACKGROUND OF THE INVENTION

1. Field of the Invention

The present invention relates generally to speed change gear systems and more particularly to a speed change gear system which is suited for applications with fluid couplings or torque converters employed within vehicles, especially automobiles.

2. Description of the Prior Art

It is desirable that the gear type speed change mechanism of automatic transmissions utilized upon large automotive vehicles, such as for example, trucks and buses should be capable of shifting between at least four forward speeds and operating with one reverse speed. This speed changing mechanism may be realized by suitably combining three, four or even more simple sets of planetary gears of the single pinion or the double pinion type, of which a variety of combinations may be considered. Within any combination of such planetary gear sets, the following conditions are desired to be satisfied:

1. The output shaft should be coupled to the same elements within each speed range.
2. In order to reduce the circumferential speed of the bearings of each element of the planetary gear set, the number of revolutions should be small.
3. The tooth load, that is, the tangential force, of each element should be small so as to maintain the strength of the gear teeth.
4. The gear set should meet the meshing conditions for the number of teeth. The sun gear whose diameter is to be minimized, as well as each planetary pinion gear, should have the necessary number of teeth.
5. Within each planetary gear set, the coupling relationship among the elements should be simple and the distance from each other should be small.
6. When attaining speed shifts by frictional coupling means during forward drive, such speed shifts should be available through one coupling means alone.

Conventional apparatus have failed to efficiently attain the aforenoted conditions.

SUMMARY OF THE INVENTION

Accordingly, it is an object of the present invention to provide an efficient speed change gear mechanism of the planetary gear type which is able to provide at least four forward drive speeds and one reverse drive speed.

The foregoing and other objectives are achieved according to the present invention through the provision of a speed change gear mechanism employing three simple planetary gear sets of the single pinion type, two clutch units, and three brake units. The movable members of the three planetary gear sets are suitably coupled to each other, and the clutch and brake units are suitably coupled, uncoupled, locked and unlocked so as to attain the desired speed ranges.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein:

FIG. 1B is a table showing the reduction gear ratios within each speed range derived as a result of the operation of the various clutches and brakes of the system of the first embodiment;

FIG. 1C is a table showing the relationship between the number of revolutions and the tangential forces characteristic of each of the elements of the planetary gear sets within each speed range of the system of the first embodiment;

FIG. 2B is a table similar to that of FIG. 1B showing however the gear ratios within the various speed ranges derived as a result of the operation of the various clutches and brakes of the system of the second embodiment;

FIG. 2C is a table similar to that of FIG. 1C showing however the relationship between the number of revolutions and the tangential forces characteristic of each of the elements of the planetary gear sets within each speed range of the system of the second embodiment;

FIG. 3B is a table similar to that of FIG. 1B showing however the gear ratios within the various speed ranges derived as a result of the operation of the clutches and brakes of the system of the third embodiment;

FIG. 3C is a table also similar to that of FIG. 1C showing however the relationship between the number of revolutions and the tangential forces characteristic of each of the elements of the planetary gear sets within each speed range of the system of the third embodiment;

FIG. 4B is a table similar to that of FIG. 1B showing however the gear ratios within the various speed ranges derived as a result of the operation of the clutches and brakes of the system of the fourth embodiment;

FIG. 4C is a table similar to that of FIG. 1C showing however the relationship between the number of revolutions and the tangential forces characteristic of each of the elements of the planetary gear sets within each speed range of the system of the fourth embodiment;

FIG. 5B is a table similar to that of FIG. 1B showing however the gear ratios within the various speed ranges derived as a result of the operation of the clutches and brakes of the system of the fifth embodiment;

FIG. 5C is a table similar to that of FIG. 1C showing however the relationship between the number of revolutions and the tangential forces characteristic of each of the elements of the planetary gear sets within each speed range of the system of the fifth embodiment;

FIG. 6B is a table similar to that of FIG. 1B showing however the gear ratios within the various speed ranges derived as a result of the operation of the clutches and brakes of the system of the sixth embodiment;

FIG. 6C is a table similar to that of FIG. 1C showing however the relationship between the number of revolutions and the tangential forces characteristic of each of the elements of the planetary gear sets within each speed range of the system of the sixth embodiment;

FIG. 7B is a table similar to that of FIG. 1B showing however the gear ratios within the various speed ranges derived as a result of the operation of the clutches and brakes of the system of the seventh embodiment;

FIG. 7C is a table similar to that of FIG. 1C showing however the relationship between the number of revolutions and the tangential forces characteristic of each of the elements of the planetary gear sets within each speed range of the system of the seventh embodiment;

FIG. 8B is a table similar to that of FIG. 1B showing however the gear ratios within the various speed ranges derived as a result of the operation of the clutches and brakes of the system of the eighth embodiment;

FIG. 8C is a table similar to that of FIG. 1C showing however the relationship between the number of revolutions and the tangential forces characteristic of each of the elements of the planetary gear sets within each speed range of the system of the eighth embodiment;

FIG. 9C is a table similar to that of FIG. 1C showing however the relationship between the number of revolutions and the tangential forces characteristic of each of the elements of the planetary gear sets within each speed range of the system of the ninth embodiment.

DETAILED DESCRIPTION OF THE PREFERRED EMBODIMENTS

Figure 1A:
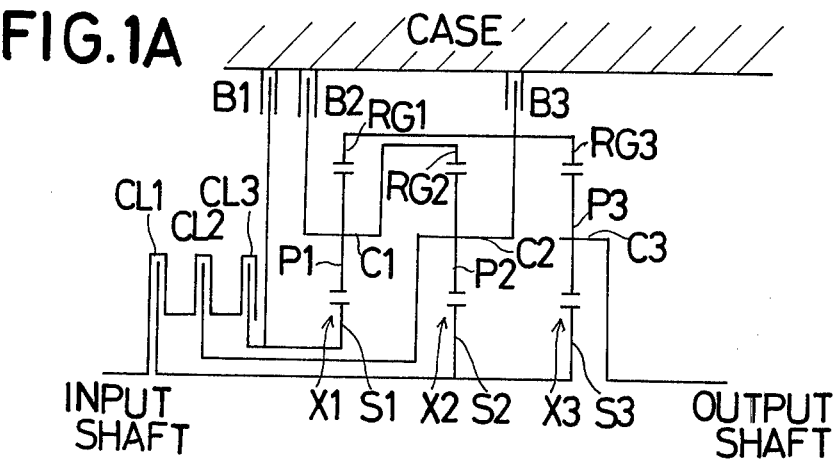
FIG. 1A is a schematic diagram of a first embodiment of a speed change gear system, constructed according to the present invention, and showing its cooperative parts.

Referring now to the drawings, and more particularly to FIG. 1A thereof, the speed change gear system of the first embodiment includes a first planetary gear set generally indicated by the reference character $x_1$ of the single pinion type, a second planetary gear set generally indicated by the reference character $X_2$ also of the single pinion type, and a third planetary gear set generally indicated by the reference character $X_3$ likewise of the single pinion type, interposed between an input shaft and an output shaft. The first planetary gear set $X_1$ includes a first sun gear $S_1$, a first planetary gear $P_1$ engaged with the first sun gear $S_1$, a first ring gear $RG_1$ interengaged with the first planetary gear $P_1$, and a first carrier $C_1$ rotatably supporting the first planetary gear $P_1$.

The second planetary gear set $X_2$ similarly includes a second sun gear $S_2$, a second planetary gear $P_2$ engaged with the second sun gear $S_2$, a second ring gear $RG_2$ engaged with the second planetary gear $P_2$, and a second carrier $C_2$ rotatably supporting the second planetary gear $P_2$, while the third planetary gear set $X_3$ includes a third sun gear $S_3$, a third planetary gear $P_3$ engaged with the third sun gear $S_3$, a third ring gear $RG_3$ enmeshed with the third planetary gear $P_3$, and a third carrier $C_3$ rotatably supporting the third planetary gear $P_3$. The second ring gear $RG_2$ is drivingly connected with the first carrier $C_1$, as are the first and third ring gears $RG_1$ and $RG_3$ with the second carrier $C_2$, as well as the second and third sun gears $S_2$ and $S_3$, and the third carrier $C_3$ is integrally connected with the output shaft.

A first clutch $CL_1$ serves to couple or uncouple the input shaft with the second and third sun gears $S_2$ and $S_3$ while a second clutch $CL_2$ similarly serves to couple or uncouple the input shaft with the first and third ring gears $RG_1$ and $RG_3$ and the second carrier $C_2$ and a third clutch $CL_3$ serves to couple or uncouple the input shaft and the first sun gear $S_1$. A first brake $B_1$ is interposed between the first sun gear $S_1$ and the gear casing so as to be capable of locking the first sun gear $S_1$ relative to the casing when the brake is actuated and a second brake $B_2$ is similarly interposed between the gear casing and the drive assembly which includes the first carrier $C_1$ and the second ring gear $RG_2$ so as to be capable of locking such elements to the casing when the brake is actuated, while a third brake $B_3$ is likewise interposed between the casing and the drive assembly which includes the first and third ring gears $RG_1$ and $RG_3$ and the second carrier $C_2$ so as to be capable of locking the same to the casing when the brake is actuated.

The following equations are given for the planetary gear sets $X_1$, $X_2$ and $X_3$ and the same hold true throughout all of the other embodiments as will be described hereinafter in greater detail:

$$N_{RG_1} - (1 + I_1) N_{C_1} + I_1 N_{S_1} = 0$$

$$N_{RG_2} - (1 + I_2) N_{C_2} + I_2 N_{S_2} = 0$$

$$N_{RG_3} - (1 + I_3) N_{C_3} + I_3 N_{S_3} = 0$$

wherein:

$N_{RG_1}$, $N_{RG_2}$, $N_{RG_3}$ = the number of revolutions of the first, second and third ring gears;

$N_{C_1}$, $N_{C_2}$, $N_{C_3}$ = the number of revolutions of the first, second and third carriers;

$N_{S_1}$, $N_{S_2}$, $N_{S_3}$ = the number of revolutions of the first, second and third sun gears; and $I_1$, $I_2$, $I_3$ = the radial ratios of each ring gear relative to each sun gear.

Within this embodiment, the radial ratios within each speed range are $I_1 = 0.419$, $I_2 = 0.320$ and $I_3 = 0.555$, and these values are the same within all embodiments of the present invention.

FIG. 1B shows the relationship between the reduction gear ratios and the various speed ranges obtained as a result of the operation of clutches $CL_1$, $CL_2$ and $CL_3$ and brakes $B_1$, $B_2$ and $B_3$ wherein $F_n(n=1, 2, 3, ...)$ designates a forward drive speed range such as for example, $F_1$ designates a first forward speed range, $F_2$ designates a second forward speed range, and $R_n$ ($n$ = 1, 2, ...) designates a reverse drive speed range, such as for example, $R_1$ designates a first reverse drive speed range. It is noted that a reduction gear ratio of 1 : 1.00 can be obtained by selectively employing two of the clutches $CL_1$, $CL_2$ and $CL_3$ and this is true within all embodiments of the present invention.

FIG. 1C shows the relationship between the number of revolutions and the tangential forces characteristic of the various elements of the planetary gear sets within each speed range. The ratio of the number of revolutions is based upon the assumption that the number of revolutions of the input shaft is 1, while the values of the tangential forces are based upon the assumption that the value of the input shaft torque exerted upon the ring gear is 1, and the tangential forces of the planetary gears are equal to those of the sun gears and the ring gears. Within FIG. 1C, A designates a particular speed range, B designates a particular element of the planetary gear sets, N designates the number of revolutions of the elements within the particular speed range, and W designates the tangential force of the particular element, such designations being the same throughout all of the embodiments of the invention.

As the reduction gear ratio of the fourth forward drive speed range $F_4$ is 1 : 1.00, the number of revolutions N of each sun gear, ring gear and carrier is 1.00 and the number of revolutions N of each planetary gear is 0.00. The tangential forces W thereof are therefore considerably less than those produced within the other speed ranges, wherein the torgue of the input shaft is transmitted to all of the gear set elements through only a single engaged clutch. To the contrary, however, the torque of the input shaft characteristic of the fourth forward drive speed $F_4$ is transmitted and distributed to all of the gear set elements as a result of the engagement of at least two clutches, and accordingly, it is clear that the tangential forces generated and impressed upon such elements are smaller than those transmitted by means of the input shaft as a result of coupling only one clutch. Herinafter therefore, the number of revolutions N and the tangential forces W within the particular speed range having a reduction gear ratio of 1 : 1.00 will be omitted.

Figure 2A:
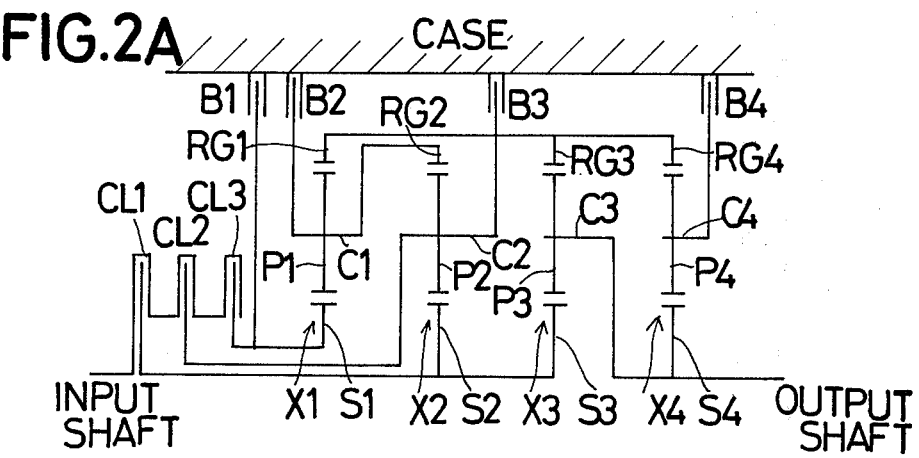
FIG. 2A is a diagram similar to that of FIG. 1A showing however a second embodiment of a speed change gear system constructed according to the present invention.

Referring now to FIG. 2A wherein a second embodiment of the present invention is disclosed, a fourth planetary gear set generally indicated by the reference character $X_4$ of the single pinion type is interposed between the third planetary gear set $X_3$ and the output shaft with respect to the embodiment of FIG. 1A and is seen to include a fourth sun gear $S_4$, a fourth planetary gear $P_4$ engaged with the fourth sun gear $S_4$, a fourth ring gear $RG_4$ engaged with the fourth planetary gear $P_4$, and a fourth carrier $C_4$ rotatably supporting the fourth planetary gear $P_4$. The fourth ring gear $RG_4$ is drivingly engaged with the first and third ring gears $RG_1$ and $RG_3$ as well as with the second carrier $C_2$, and the fourth ring gear $RG_4$ is locked, as well as are the first and third ring gears $RG_1$ and $RG_3$ and the second carrier $C_2$, when the third brake $B_3$ is actuated. A fourth brake $B_4$ is interposed between the fourth carrier $C_4$ and the gear casing so as to be capable of locking the fourth carrier $C_4$ relative to the casing when the brake is actuated, and it is also seen that the fourth sun gear $S_4$ is drivingly engaged with the third carrier $C_3$ as well as with the output shaft.

The following formula is given for the fourth planetary gear set $X_4$:

$$N_{RG_4} - (1 + I_4)N_{C_4} + I_4 N_{S_4} = 0$$

wherein:
$N_{RG_4}$ = the number of revolutions of the fourth ring gear;
$N_{C_4}$ = the number of revolutions of the fourth carrier;
$N_{S_4}$ = the number of revolutions of the fourth sun gear; and
$I_4$ = the radial ratio of the fourth ring gear relative to the fourth sun gear.

Within this embodiment, the radial ratio within each speed range is $I_4 = 0.562$, and FIG. 2B shows the relationship between the reduction gear ratios within each speed range as a result of the operation of the various clutches $CL_1$, $CL_2$ and $CL_3$ and brakes $B_1$, $B_2$, $B_3$ and $B_4$ while FIG. 2C shows the relationship between the number of revolutions and the tangential forces characteristic of the elements of the planetary gear sets within each speed range.

Figure 3A:
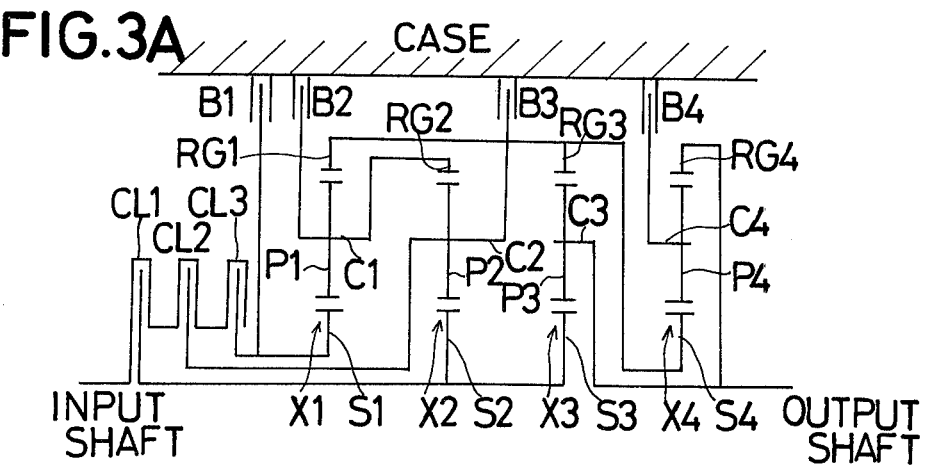
FIG. 3A is a diagram also similar to that of FIG. 1A showing however a third embodiment of a speed change gear system constructed according to the present invention.

Referring now to FIG. 3A, a third embodiment of the present invention is disclosed wherein the fourth planetary gear set $X_4$ of the single pinion type is interposed between the third planetary gear set $X_3$ and the output shaft, and the set is seen to include a fourth sun gear $S_4$ drivingly engaged with the first and third ring gears $RG_1$ and $RG_3$ and the second carrier $C_2$, the entire assembly being capable of being locked to the gear when the third brake $B_3$ is actuated. A fourth brake $B_4$ is also interposed between the fourth carrier $C_4$ and the casing so as to be capable of locking the fourth carrier $C_4$ relative thereto when such brake is actuated.

Within this embodiment, the radial ratio within the speed ranges is $I_4 = 0.562$ and FIG. 3B shows the relationship between the reduction gear ratios within each speed range as a result of the operation of the clutches and brakes while FIG. 3C shows the relationship between the number of revolutions and the tangential forces characteristic of the elements of the planetary gear sets within each speed range.

Figure 4A:
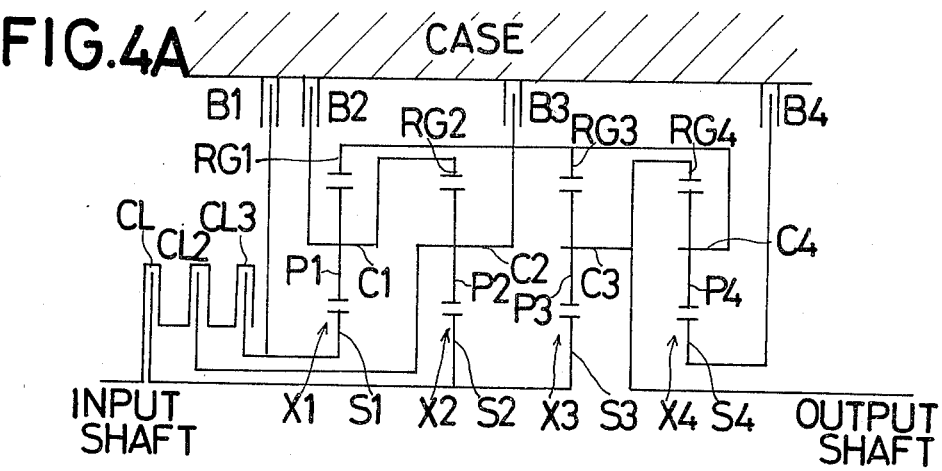
FIG. 4A is a diagram similar to that of FIG. 1A showing however a fourth embodiment of a speed change gear system constructed according to the present invention.

With reference now being made to FIG. 4A, the embodiment disposes the fourth planetary gear set $X_4$ of the single pinion type between the third planetary gear set $X_3$ and the output shaft in shuc a manner that the fourth carrier $C_4$ is drivingly engaged with the first and third ring gears $RG_1$ and $RG_3$ as well as with the second carrier $C_2$, the entire assembly thereby being capable of being locked relative to the gear casing when the third brake $B_3$ is actuated. The fourth brake $B_4$ is interposed between the fourth sun gear $S_4$ and the gear casing so as to be capable of locking the fourth sun gear $S_4$ relative thereto when the brake is actuated, and it is also noted that the fourth ring gear $RG_4$ is drivingly engaged with the third carrier $C_3$ as well as with the output shaft.

Within this embodiment, the radial ratio within each speed range is $I_4 = 0.562$, and FIG. 4B shows the relationship between the gear ratios and the speed ranges as a result of the operation of the clutches and the brakes while FIG. 4C shows the relationship between the number of revolutions and the tangential forces characteristic of all the elements of the planetary gear sets within each speed range.

Figure 5A:
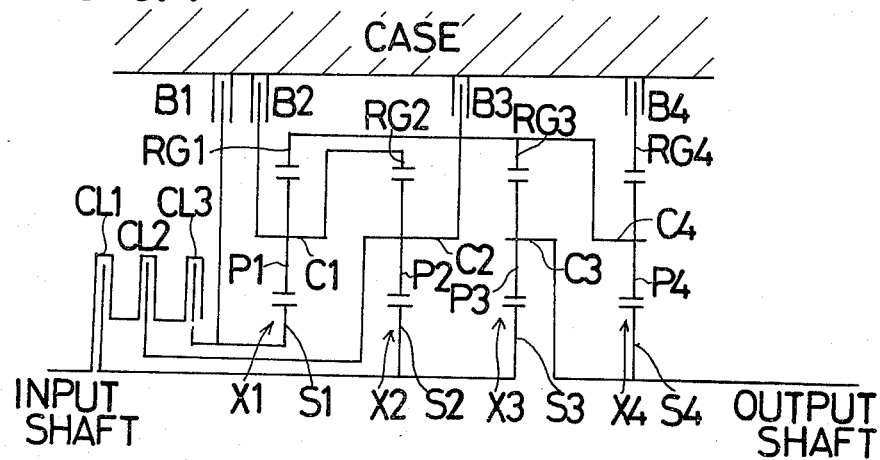
FIG. 5A is a diagram similar to that of FIG. 1A showing however a fifth embodiment of a speed change gear system constructed according to the present invention.

A fifth embodiment of the system is illustrated within FIG. 5A, and it is seen that the fourth planetary gear set $X_4$ of the single pinion type is interposed between the third planetary gear set $X_3$ and the output shaft wherein the fourth carrier $C_4$ is drivingly engaged with the first and third ring gears $RG_1$ and $RG_3$ and the second carrier $C_2$ and the entire assembly is capable of being locked relative to the gear casing when the third brake $B_3$ is actuated. A fourth brake $B_4$ is disposed between the fourth ring gear $RG_4$ and the casing so as to be capable of locking the fourth ring gear $RG_4$ relative thereto when the brake is actuated, and the fourth sun gear $S_4$ is drivingly engaged with the third carrier $C_3$ as well as with the output shaft.

Within this embodiment, the radial ratio within the speed ranges is $I_4 = 0.562$, and FIG. 5B shows the relationship between the gear ratios and the speed ranges as a result of the operation of the clutches and brakes and FIG. 5C shows the relationship between the number of revolutions and the tangential forces characteristic of the elements within the planetary gear sets within each speed range.

Figure 6A:
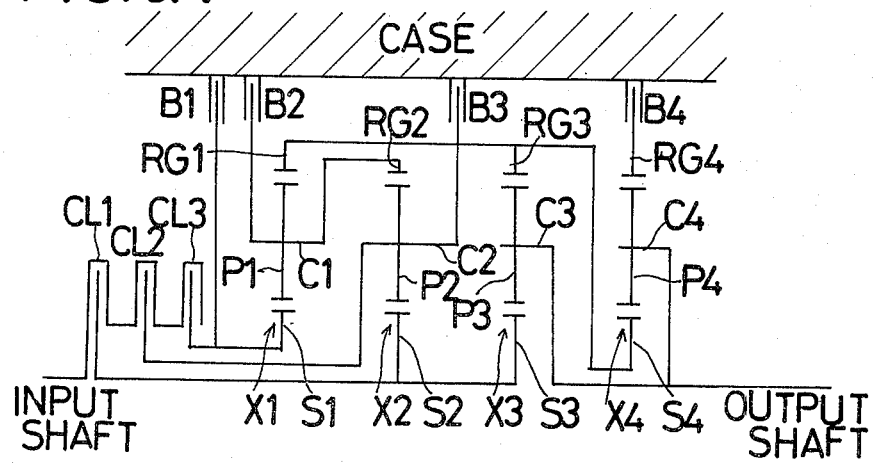
FIG. 6A is a diagram similar to that of FIG. 1A showing however a sixth embodiment of a speed change gear system constructed according to the present invention.

Turning now to the consideration of a sixth embodiment of the present invention which is illustrated within FIG. 6A, the fourth planetary gear set $X_4$ of the single pinion type is disposed between the third planetary gear set $X_3$ and the output shaft and it is seen that the fourth sun gear $S_4$ is drivingly engaged with the first and third ring gears $RG_1$ and $RG_3$ and the second carrier $C_2$ and the same are capable of being locked relative to the gear casing when the third brake $B_3$ is actuated. The fourth brake $B_4$ is also disposed between the fourth ring gear $RG_4$ and the gear casing and is consequently capable of being locked relative to the casing when the brake is actuated, it also being noted that the fourth carrier $C_4$ is drivingly engaged with the third carrier $C_3$ as well as with the output shaft.

Within this embodiment, the radial ratio within each speed range is $I_4 = 0.437$ and FIG. 6B shows the relationship between the gear ratios and the speed ranges as a result of the operation of the clutches and brakes and FIG. 6C shows the relationship between the number of revolutions and the tangential forces characteristic of the elements of the planetary gear sets within each speed range.

Figure 7A:
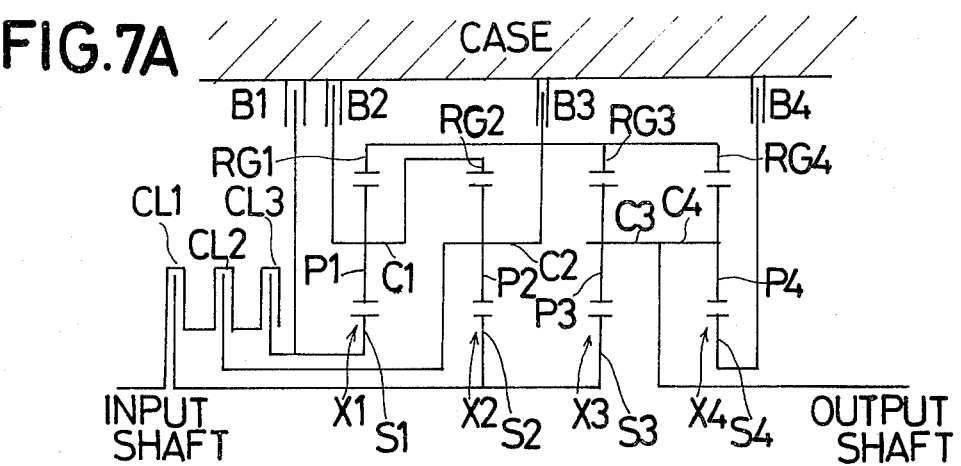
FIG. 7A is a diagram similar to that of FIG. 1A showing however a seventh embodiment of a speed change gear system constructed according to the present invention.

Considering now a seventh embodiment of the present invention in connection with FIG. 7A, the fourth planetary gear set $X_4$ of the single pinion type is again interposed between the third planetary gear set $X_3$ and the output shaft and is seen to include a fourth ring gear $RG_4$ which is drivingly engaged with the first and third ring gears $RG_1$ and $RG_3$ and the second carrier $C_2$ such elements being capable of being locked relative to the gear casing when the third brake $B_3$ is actuated. A fourth brake $B_4$ is disposed between the fourth sun gear $S_4$ and the casing for locking the fourth sun gear $S_4$ relative thereto when the brake is actuated, and the fourth carrier $C_4$ is drivingly engaged with the third carrier $C_3$ as well as with the output shaft.

Within this embodiment, the radial ratio within each speed range is $I_4 = 0.562$ and FIG. 7B shows the relationship between the gear ratios and the speed ranges as a result of the operation of the clutches and brakes while FIG. 7C shows the relationship between the number of revolutions and the tangential forces characteristic of all of the elements of the planetary gear sets within each speed range.

Figure 8A:
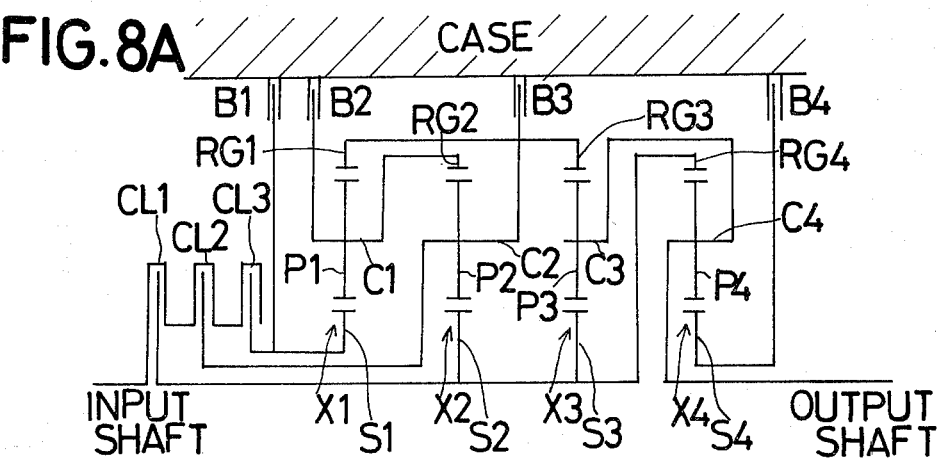
FIG. 8A is a diagram similar to that of FIG. 1A showing however an eighth embodiment of a speed change gear system constructed according to the present invention.

An eighth embodiment of the present invention is illustrated within FIG. 8A, wherein the fourth planetary gear set $X_4$ of the single pinion type is seen to be disposed between the third planetary gear set $X_3$ and the output shaft and includes a fourth ring gear $RG_4$ drivingly engaged with the second and third sun gears $S_2$ and $S_3$. The fourth brake $B_4$ is interposed between the fourth sun gear $S_4$ and the gear casing so as to be capable of locking the fourth sun gear $S_4$ relative to the casing when the brake $B_4$ is actuated and the fourth carrier $C_4$ is drivingly engaged with the third carrier $C_3$ as well as with the output shaft.

Within this embodiment, the radial ratio within each speed range is $I_4 = 0.280$ and FIG. 8B shows the relationship between the gear ratios and the speed ranges as a result of the operation of the clutches and brakes while FIG. 8C shows the relationship between the number of revolutions and the tangential forces characteristic of all of the elements of the planetary gear sets within each speed range.

Figure 9A:
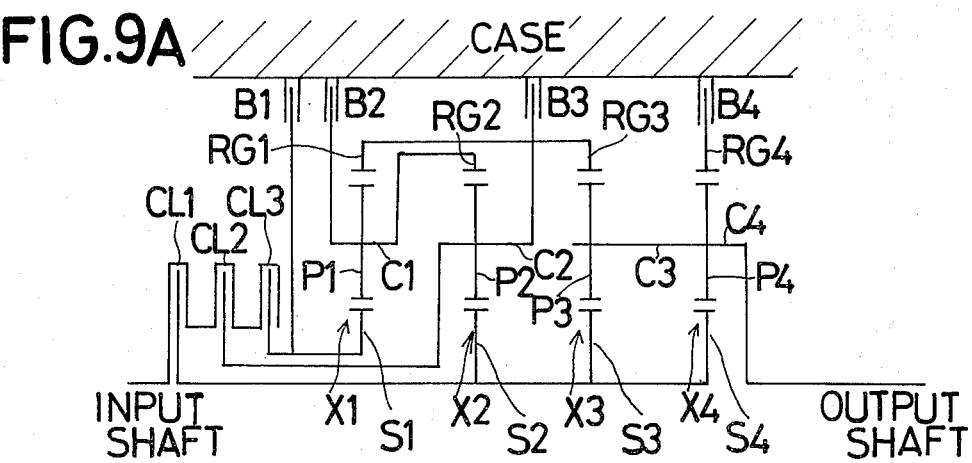
FIG. 9A is a diagram similar to that of FIG. 1A showing however a ninth embodiment of a speed change gear system constructed according to the present invention.

A ninth embodiment of the present invention is illustrated within FIG. 9A, wherein the fourth planetary gear set $X_4$ of the single pinion type is interposed between the third planetary gear set $X_3$ and the output shaft and is seen to include a fourth sun gear $S_4$ drivingly engaged with the second and third sun gears $S_2$ and $S_3$. The fourth brake $B_4$ is disposed between the fourth ring gear $RG_4$ and the casing so as to be capable of locking the fourth ring gear $RG_4$ relative to the casing when the brake $B_4$ is actuated, and the fourth carrier $C_4$ is drivingly engaged with the third carrier $C_3$ as well as with the output shaft.

Figure 9B:
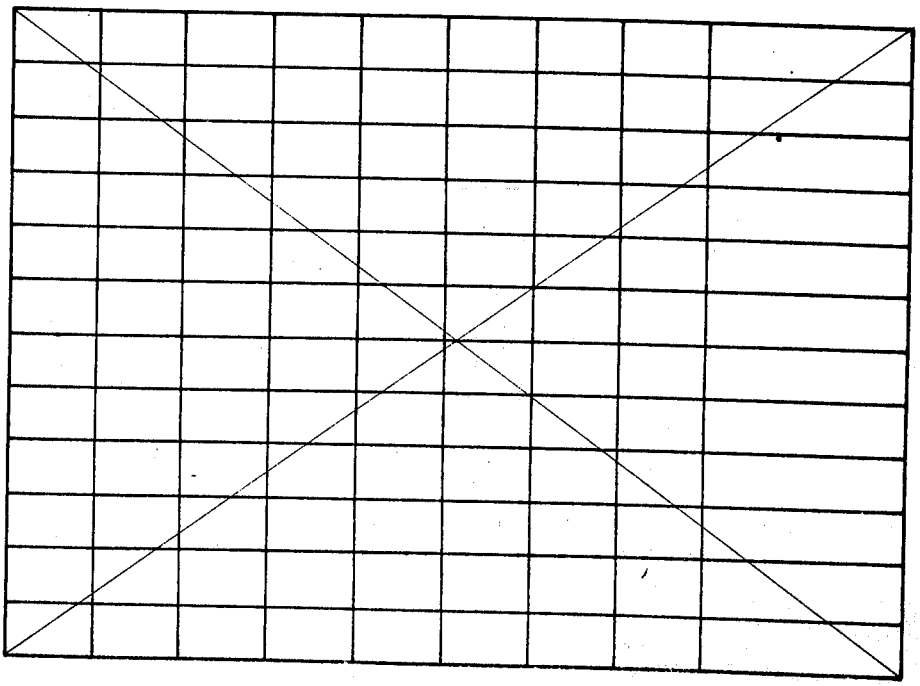
FIG. 9B is a table similar to that of FIG. 1B showing however the gear ratios within the various speed ranges derived as a result of the operation of the clutches and brakes of the system of the ninth embodiment.

Within this embodiment, the radial ratio within each speed range is $I_4 = 0.280$ and FIG. 9B shows the relationship between the gear ratios and the speed ranges as a result of the operation of the clutches and brakes while FIG. 9C shows the relationship between the number of revolutions and the tangential forces characteristic of all of the elements of the planetary gear sets within each speed range.

Thus, it may be seen that the present invention has important advantages over prior art speed change gear systems in that the speed change gear system of the present invention is capable of shifting between at least four forward drive speeds and one reverse drive speed, the same being readily and simply realized, the effect of which will no doubt contribute greatly to the development of the motor vehicle industry.

Obviously, numerous modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A speed change gear system comprising:
   an input shaft;
   a first sun gear;
   a first planetary gear engaged with said first sun gear;
   a first ring gear enaged with said first planetary gear;
   a first carrier rotatably supporting said first planetary gear;
   a second ring gear drivingly connected to said first carrier;
   a second planetary gear engaged with said second ring gear;
   a second sun gear engaged with said second planetary gear;
   a second carrier rotatably supporting said second planetary gear;
   a third sun gear drivingly connected to said second sun gear;

a third planetary gear engaged with said third sun gear;
a third ring gear engaged with said third planetary gear and drivingly connected to said first ring gear and said second carrier;
a third carrier rotatably supporting said third planetary gear;
a first clutch for simultaneously coupling or uncoupling said second and third sun gears to or from said input shaft;
a second clutch for simultaneously coupling or uncoupling said second carrier and said first and third ring gears to or from said input shaft;
a third clutch for coupling or uncoupling said first sun gear to or from said input shaft;
a first brake capable of being actuated for locking said first sun gear to a gear casing;
a second brake capable of being actuated for simultaneously locking said first carrier and said second ring gear to said casing;
a third brake capable of being actuated for simultaneously locking said first and third ring gears and said second carrier to said casing; and
an output shaft dynamically and integrally connected to said third carrier.

2. A speed change gear system as set forth in claim 1, additionally comprising:
a fourth ring gear drivingly connected to said first and third ring gears and said second carrier;
a fourth planetary gear engaged with said fourth ring gear;
a fourth carrier rotatably supporting said fourth planetary gear;
a fourth brake capable of being actuated for locking said fourth carrier to said gear casing; and
a fourth sun gear engaged with said fourth planetary gear and dynamically and integrally connected to said output shaft.

3. A speed change gear system as set forth in claim 1, additionally comprising:
a fourth sun gear drivingly connected to said first and third ring gears and said second carrier;
a fourth planetary gear engaged with said fourth sun gear;
a fourth carrier rotatably supporting said fourth planetary gear;
a fourth brake capable of being actuated for locking said fourth carrier to said gear casing; and
a fourth ring gear engaged with said fourth planetary gear and dynamically and integrally connected to said output shaft.

4. A speed change gear system as set fourth in claim 1, additionally comprising:
a fourth ring gear drivingly connected to said second and third sun gears;
a fourth planetary gear engaged with said fourth ring gear;
a fourth sun gear engaged with said fourth planetary gear;
a fourth brake capable of being actuated for locking said fourth sun gear to said gear casing; and
a fourth carrier rotatably supporting said fourth planetary gear and dynamically and integrally connected to said third carrier and said output shaft.

5. A speed change gear system as set fourth in claim 1, additionally comprising:
a fourth sun gear drivingly connected to said second and third sun gears;
a fourth planetary gear engaged with said fourth sun gear;
a fourth ring gear engaged with said fourth planetary gear;
a fourth brake capable of being actuated for locking said fourth ring gear to said gear casing; and
a fourth carrier rotatably supporting said fourth planetary gear and dynamically and integrally connected to said third carrier and said output shaft.

* * * * *